United States Patent [19]

Fitzpatrick

[11] Patent Number: 4,913,375

[45] Date of Patent: Apr. 3, 1990

[54] VEHICLE FOR USE ON LAND, AIR, OR WATER

[76] Inventor: Peter J. Fitzpatrick, 467 Kearny Ave., Kearny, N.J. 07032

[21] Appl. No.: 230,242

[22] Filed: Aug. 9, 1988

[51] Int. Cl.$^4$ .................. B64C 37/00; B64C 35/02
[52] U.S. Cl. ........................ 244/2; 244/49; 114/39.1
[58] Field of Search ............ 244/2, 105, 49, 13; 114/39.1

[56] References Cited

U.S. PATENT DOCUMENTS

| | | | |
|---|---|---|---|
| 2,940,688 | 6/1960 | Bland | 244/2 |
| 3,012,737 | 12/1961 | Dodd | 244/2 |
| 3,134,560 | 5/1964 | Halsman | 244/2 |
| 3,614,032 | 10/1971 | Purcell | 244/2 |
| 4,269,374 | 5/1981 | Miller | 244/2 |

*Primary Examiner*—Galen Barefoot
*Attorney, Agent, or Firm*—Berman, Aisenberg & Platt

[57] ABSTRACT

A vehicle usable in the air, on water, or on ground is described. Outer wing portions are connected to a central portion by a mechanism which allows the outer wing portions to pivot about first axes for placing the outer wing portions in stored positions. The outer wing portions are also rotatable about a second axis for placing them in positions whereby they are useful as sails for driving the vehicle without the use of an engine. The wheels are capable of being pivoted to non-positions.

12 Claims, 4 Drawing Sheets

VEHICLE FOR USE ON LAND, AIR, OR WATER

TECHNICAL FIELD

This invention relates to the art of vehicles. In particular, the invention is a vehicle which is a capable of land, sea, or air travel.

BACKGROUND ART

Vehicles which are capable of traveling on ground, in the air, or the water, are known. For example, such vehicles are generally shown in U.S. Pat. Nos. 3,092,042 (Martin), 3,371,886 (Schertz), 4,165,846 (Groeger), and 4,579,297 (Ayoola).

None of the prior art devices, however, provides a vehicle which is truly versatile, the arrangements for changing the configuration of the vehicle being either quite difficult to use or ineffective.

SUMMARY OF THE INVENTION

In accordance with the invention, a truly versatile vehicle is provided which is capable of operating over the land, in the air, or on water. The vehicle comprises a frame on which are mounted wheels for engaging the ground and pontoons for providing buoyancy to the vehicle. The wheels are pivotally mounted to the frame so that they may be placed in a ground-engaging position or rotated upwardly to permit the pontoons to engage a body of water. One means for powering the vehicle is a rearwardly-directed propeller which is driven by an internal combustion engine in a known fashion.

A particularly unique feature of the vehicle according to the invention is the mounting and placement of wings. These wings provide both lift for operation of the vehicle as an airplane, and horizontally directed forces for operation of the vehicle in a sailing mode.

The upper portion of the vehicle comprises a centrally-mounted part which is attached to the frame by appropriate struts, or the like. Two movable wing portions are attached on opposite sides of the central portion. In the preferred embodiment, the central portion is spaced from the frame by a distance adequate to allow the operator of the vehicle and passengers to sit therebetween.

The outer wing portions are mounted to the central portion by a mechanism which allows them to pivot downwardly about first axes which diverge from each other and from a longitudinal axis of the vehicle and to pivot about a second, transverse axis.

When the outer wing portions are pivoted about the diverging axes, the wings may be placed in a stored condition to allow the vehicle to be driven about on land or water and to be powered by the propeller. When the outer wing portions are pivoted about the second axis, the wings extend upwardly whereby they may be used as sails to provide horizontal forces to drive the vehicle on the land or on water.

The distance between the central portion and the frame is preferably such that the outer wing portions are compactly stored when pivoted about the first axis.

Roll control is provided by ailerons mounted on the outer parts of the movable wing portions, pitch control is provided by elevators mounted between the frame and central portion, and yaw control is provided by pivotally mounted rudders mounted to the rear of the frame member.

To provide convenience in repair, a jack mechanism is preferably associated with each wheel.

It is an object of this invention to provide a unique vehicle capable of travel in the air, over the land, or on water.

Another object of this invention is to provide a vehicle having wing portions which may be moved between a first position wherein they provide aerodynamic lift to the vehicle and a second position wherein they provide horizontal driving forces.

DETAILED DESCRIPTION OF THE INVENTION

Figure 1:
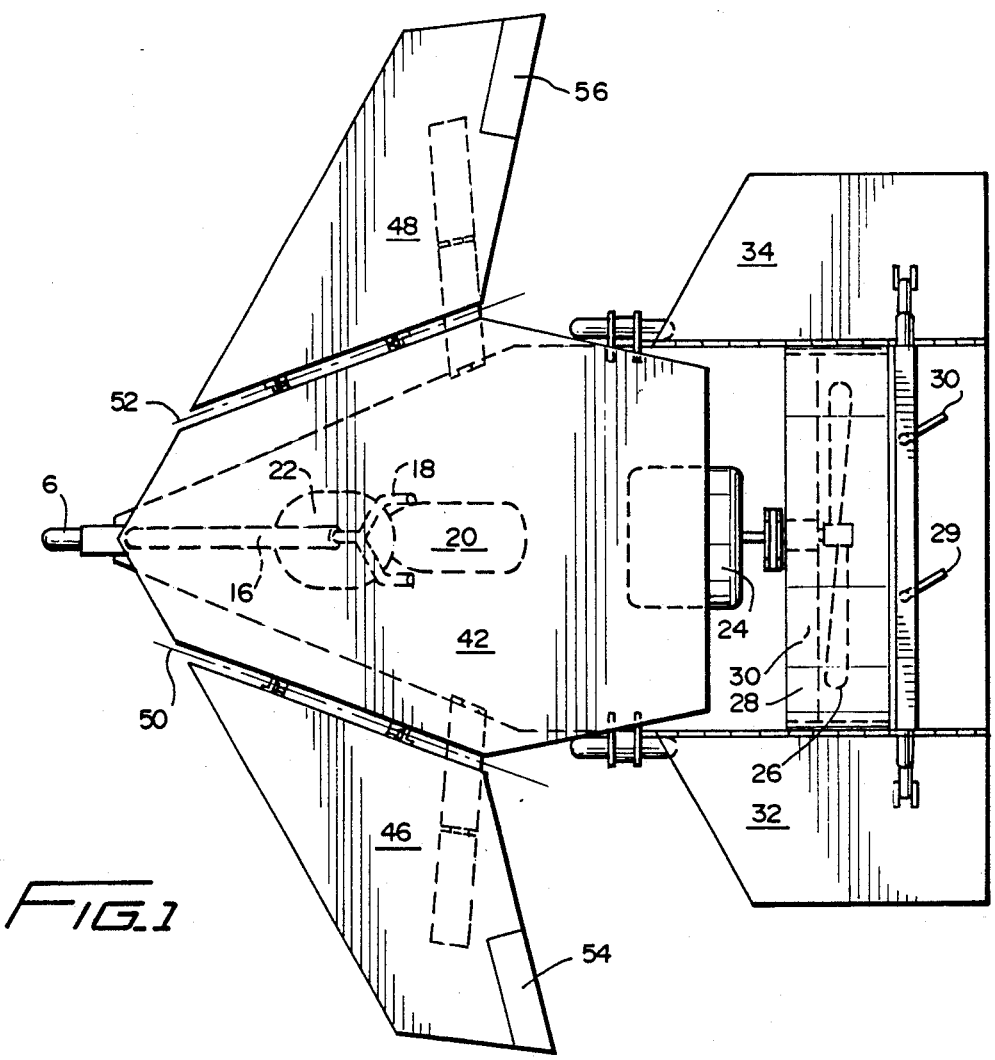
FIG. 1 is a plan view of a preferred embodiment of the invention.
Figure 2:
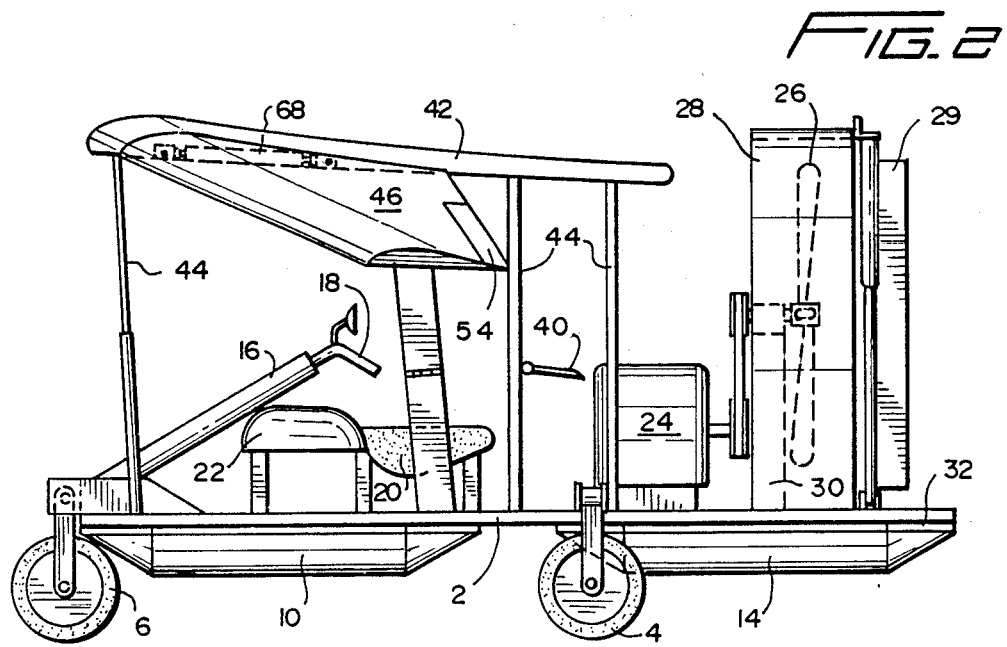
FIG. 2 is a side view of the vehicle of FIG. 1.
Figure 3:
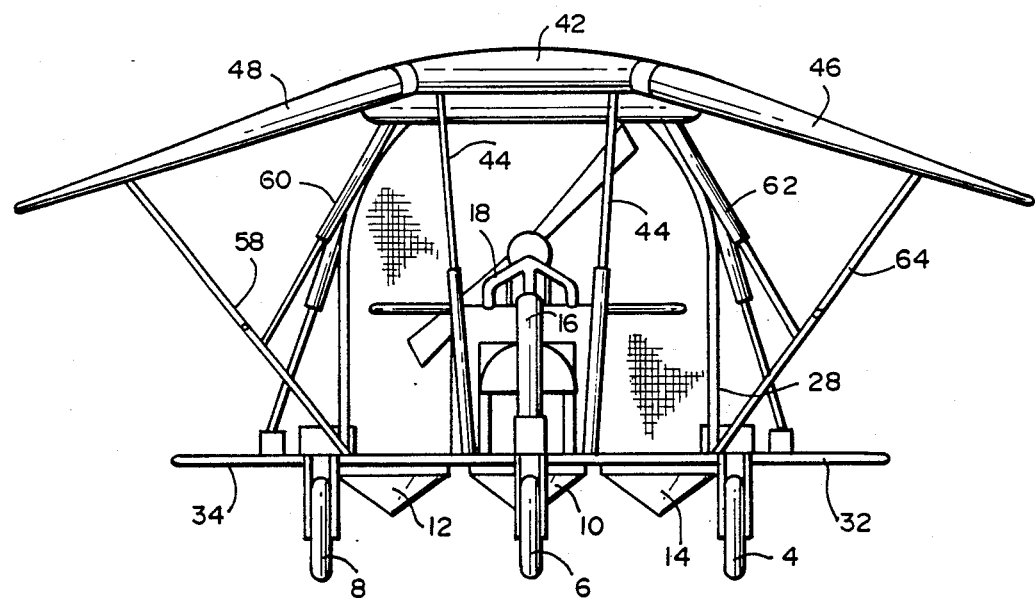
FIG. 3 is a front view of the vehicle of FIG. 1.

With reference to FIGS. 1 through 3, a preferred embodiment of the vehicle in accordance with the invention comprises a frame 2 to which wheels 4, 6, and 8 are pivotally mounted. These wheels provide means for the vehicle to travel over land and may be pivoted upwardly (see FIG. 5) when the vehicle is being flown or is floating on water. Pontoons 10, 12 and 14 provide buoyancy for the vehicle and may be filled with a foam material. It is also within the contemplation of the invention for the frame to be filled with a foam material. Front wheel 6 is attached to a steering column 16 which is controlled by handle bars 18 for steering by the operator.

The illustrated embodiment utilizes a motorcycle-style seat 20 and fuel tank 22. These are mounted securely to frame 2 and are located such that the operator has a panoramic view from seat 20. Of course, other seating arrangements may be employed.

Engine 24 drives a propeller 26 for powering the vehicle in a first mode of operation. Propeller 26 is surrounded by a protective shroud 28 and is mounted on a stand 30 by a bearing which is known in the art. The drive connection between engine 24 and propeller 26 is also known in the art and preferably includes a variable ratio transmission.

Pivotally mounted to the rear of frame 2 are horizontal stabilizers 32 and 34. These are mounted to the frame at pivotal connections 36 and 38 which extend in directions parallel to the longitudinal axis of the vehicle. Stabilizers 32 and 34 may be pivoted upwardly to stored positions (see FIGS. 4 and 6) or pivoted to the operational horizontal position shown in FIGS. 1 through 3.

Pitch control is provided by Elevator 40. This is a horizontal plate pivotally mounted about a transverse axis and is operable by a linking mechanism (not shown) connected to foot pedals adjacent seat 20 for control by the operator.

Rudders 29 and 31 are mounted for rotation about vertical axes for providing yaw control.

The upper part of the vehicle includes a central portion 42 which is secured to the frame by struts 44. Central portion 42 is preferably configured to provide aerodynamic lift, but the major portion of the lift is provided by an airfoil comprising outer wing portions 46 and 48. Portions 46 and 48 are attached to central portion 42 by a unique mechanism which will be described in more detail with respect to FIG. 7. This mechanism permits the portions 46 and 48 to be rotated about respective first axes 50 and 52 when moving outer portions 46 and 48 from the operational position shown in FIGS. 1 through 3 to the stored position shown in FIG. 6.

Outer wing portions 46 and 48 include ailerons 54 and 56 for providing roll control. These ailerons are operated by known mechanisms from the operator's station.

Wing Struts 58, 60, 62, and 64 are foldable to permit the wing portions 46 and 48 to be pivoted downwardly. Preferably, strut 60 is attached to strut 58 by a hinge, strut 62 is attached to strut 64 by a hinge, and struts 58 and 64 are made of two portions connected to each other by a centrally-located hinge. Struts 60 and 62 are telescoping struts to permit portions 46 and 48 to be pivoted downwardly about axes 50 and 52. Reducing the length of struts 60 and 62, allows struts 58 and 64 to fold inwardly about the hinge.

Figure 4:
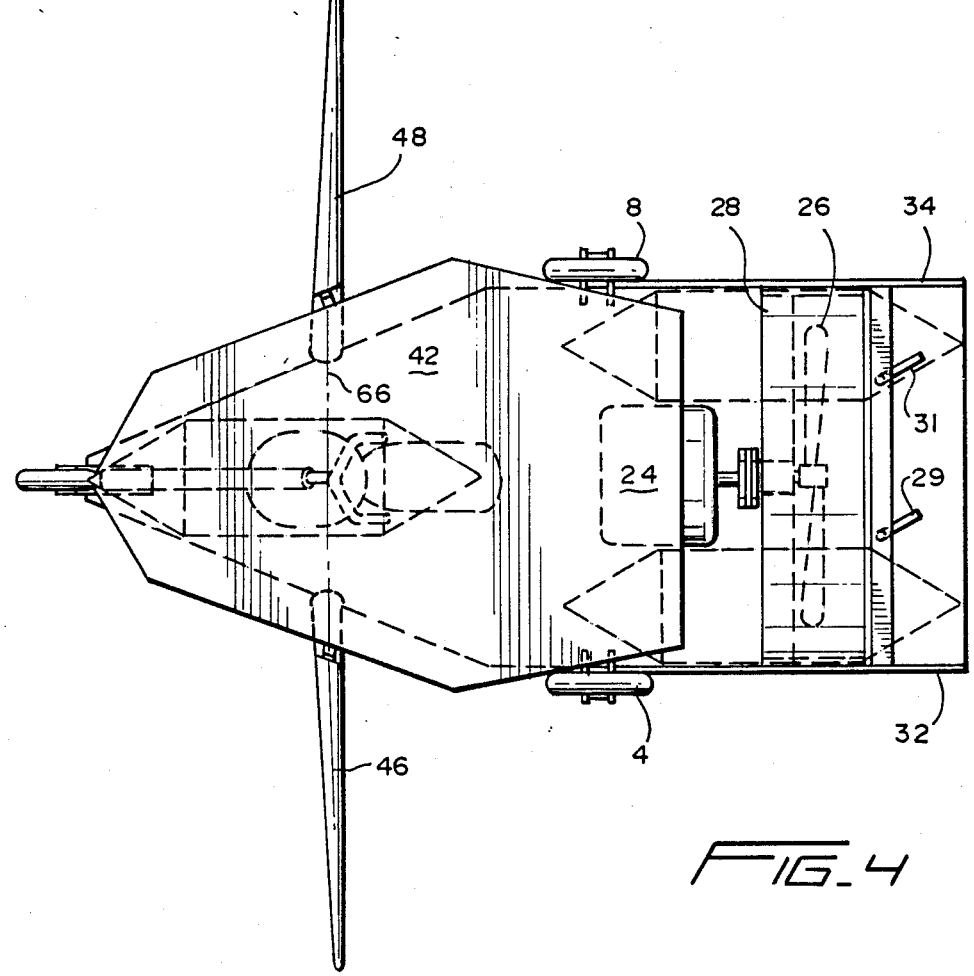
FIG. 4 is a plan view of the vehicle of FIG. 1 wherein the wings have been rotated into sailing positions.
Figure 5:
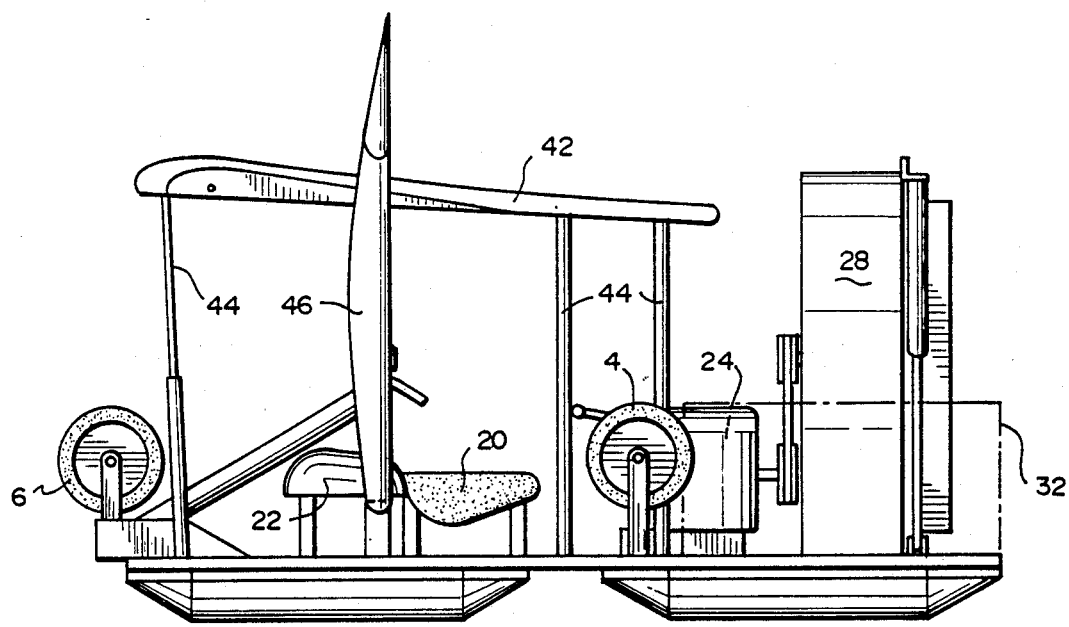
FIG. 5 is a side view of that shown in FIG. 4.

FIGS. 4 and 5 show the vehicle with the outer wing portions 46 and 48 pivoted to positions whereby they may be used as sails. To accomplish this, portions 46 and 48 are rotated about an axis 66 whereby the air foils are then upwardly directed and capable of rotation about a vertical axis. In this mode, horizontal stabilizers 32 and 34 are rotated upwardly, and wheels 4, 6, and 8 may also be rotated to non-use positions as shown in FIG. 5.

It will be appreciated that outer wings portions 46 and 48 may be manipulated by the operator independently to orient them with respect to the prevailing wind such that horizontal driving forces are produced for driving the vehicle on either land or water.

Figure 6:
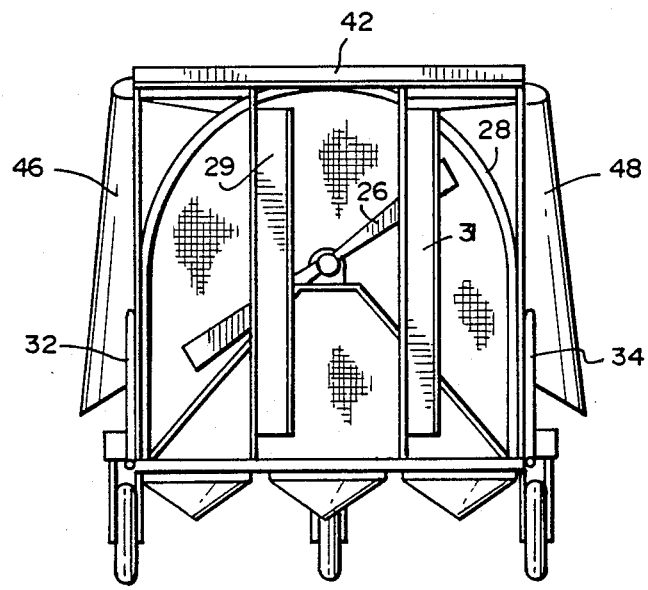
FIG. 6 is a front view of the vehicle with the wings in stored positions.
Figure 7:
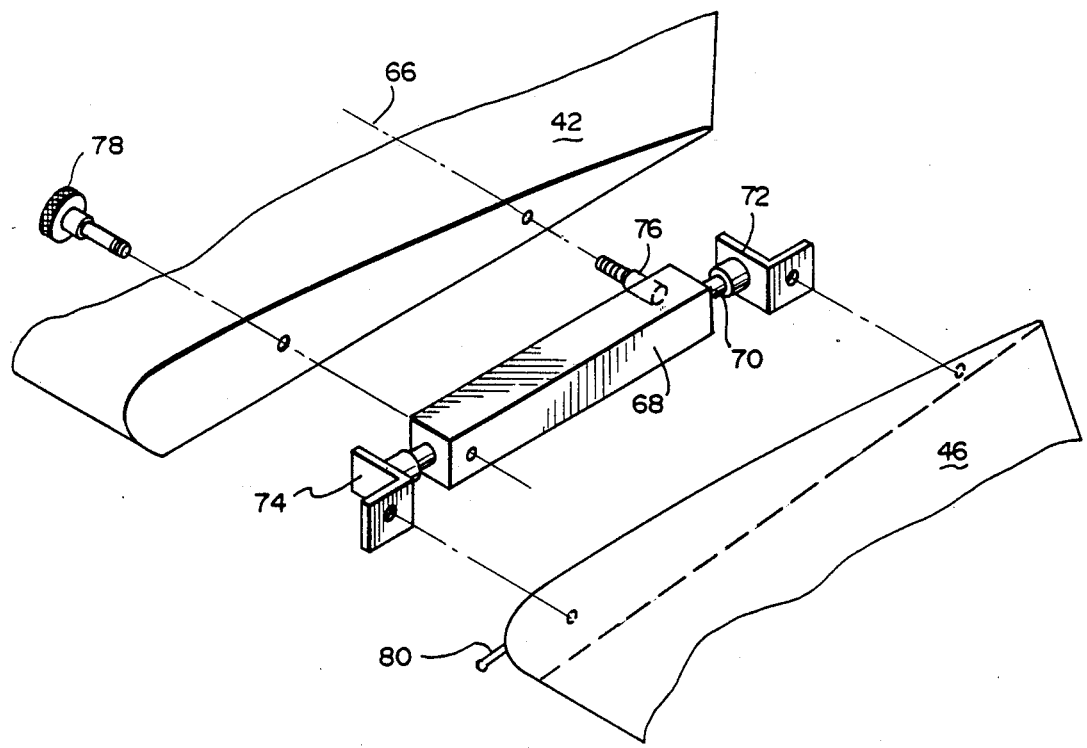
FIG. 7 is an exploded diagram of a preferred pivoting mechanism for the outer wing portions.

FIGS. 7 is an exploded diagram of a preferred mechanism for allowing the outer wing portion 46 and 48 to be moved between the stored position shown in FIG. 6 and the sailing position shown in FIGS. 4 and 5. A bearing block 68 pivotally supports a shaft 70 which is in turn connected by brackets 72 and 74 to a wing portion 46. Block 68 is attached to central portion 42 by a shaft 76 and by a bolt 78. It will be appreciated that wing 46 is rotatable about an axis formed by shaft 70 by manipulation of struts 62 and 64 as described above. When it is desired to rotate wing portion 46 into the sailing position illustrated in FIGS. 4 and 5, bolt 78 is removed, and the wing is rotated about axis 66 which is coincident with shaft 76. Then, pins 80, located on the front of each of the portions 46 and 48 are engaged in brackets on frame 2 for securing the outer wing portions in the sailing positions while permitting rotation of the wing portions about respective vertical axes.

FIG. 6 is a rear view of the vehicle in accordance with the invention wherein the outer Portions 46 and 48 and horizontal stabilizer 32 and 34 have been placed in stored positions.

Figure 8:
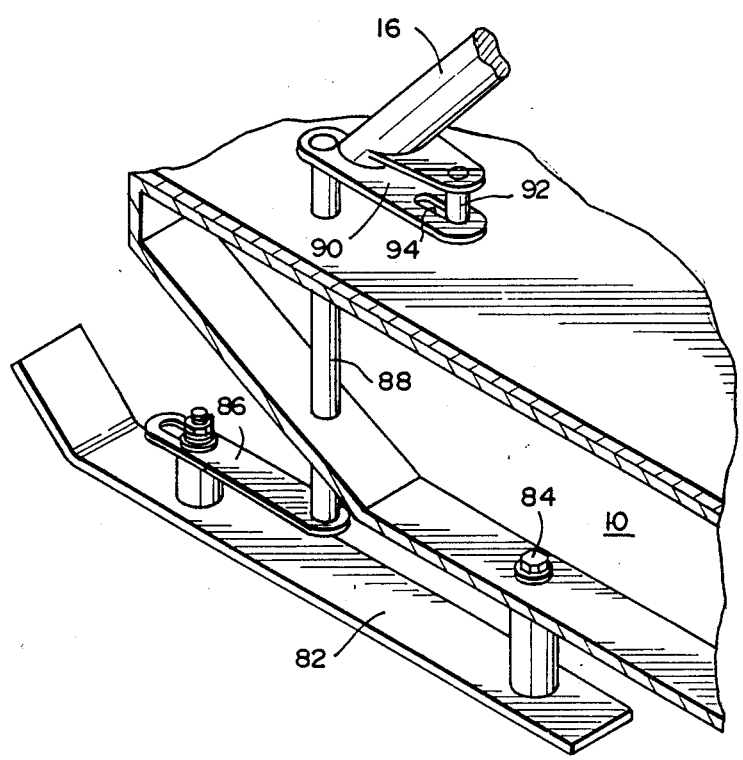
FIG. 8 is a exploded view of a preferred front ski mechanism.

FIG. 8 is an exploded view of a ski which is alternatively used on the front of the vehicle. Ski 82 is mounted to the bottom of pontoon 10 by a bolt 84. A front part of the ski is mounted to a pivotal arm 86 which is in turn connected to a shaft 88 for rotation therewith. Shaft 88 is driven by arm 90, and arm 90 is rotationally controlled by a pin 92 connected to shaft 16. Pin 92 fits within a slot 94 in arm 90. It will be appreciated that rotation of steering column 16 causes rotation of the front of ski 82 to permit steering.

A unique vehicle has been described wherein outer wing portions may be pivoted between an airplane-like wing orientation, a sailing orientation, and a stored orientation. Thus, the vehicle may be easily converted for use on land, sea, or air. Modifications of the preferred embodiment within the scope of the claims will be apparent to those of skill in the art.

I claim:

1. A vehicle comprising frame means, flotation means for providing buoyancy to said vehicle, wheel means attached to said frame means for engaging the ground when in a first position and for retracting to a second position, and wing means for providing aerodynamic lift, said wing means comprising a central portion fixed to said frame, two movable portions on respective opposed sides of said central portion, and pivot means for allowing said movable portions to be pivoted about respective first axes between first positions wherein said movable portions provide vertical lift to said vehicle and second positions wherein said movable portions are stored, and about respective second axes wherein said movable portions provide horizontal driving forces to said vehicle wherein said second axes are transverse to the longitudinal axis of the vehicle, are located toward the rear of said movable portions, and diverge from respective trailing edges of said movable portions.

2. A vehicle according to claim 1 wherein said first axes are not parallel and diverge from the longitudinal axis of said frame means.

3. A vehicle according to claim 2 wherein said pivot means comprises bearing block means for attachment to said central portion, a first shaft carried by said bearing block means for attachment to a said movable portion, and a second shaft attached to said bearing block for permitting pivoting said bearing block with respect to said central portion about said second axes.

4. A vehicle according to claim 3 wherein the distance between said central portion and said frame is approximately equal to the height of a said movable portion when said movable portion is in said stored position.

5. A vehicle according to claim 4 further comprising a propeller means for driving said vehicle.

6. A vehicle according to claim 5 wherein said propeller means is mounted on a rearward portion of said frame means.

7. A vehicle according to claim 6 further comprising horizontal stabilizer means mounted to a rearward portion of said frame, said horizontal stabilizer means comprising two surfaces pivotally mounted on respective opposite sides of said frame whereby each of said surfaces may be pivoted between operational and stored positions.

8. A vehicle according to claim 7 further comprising elevator means for providing pitch control, said elevator means comprising transversely extending surfaces mounted between said central portion and said frame means for rotation about a transverse axis.

9. A vehicle according to claim 8 further comprising rudder means mounted between said frame means and said central portion for providing yaw control of said vehicle.

10. A vehicle according to claim 9 further comprising aileron means on each of said movable portions for providing roll control of said vehicle.

11. A vehicle according to claim 10 further comprising jack means for lifting a wheel off the ground to permit repair of said wheel.

12. A vehicle comprising frame means, a central portion having two outer airfoil means attached thereto, and means for allowing each of airfoil means to move between respective first positions wherein said airfoil means provide aerodynamic lift and respective second positions wherein said airfoil means provides horizontal driving forces, said means for allowing comprising means for rotating each of said airfoil means about respective axes which are transverse to the longitudinal axis of the vehicle, are located toward the rear of the outer airfoil means, and diverge from each other and from the trailing edges of respective said airfoil means.

* * * * *